United States Patent [19]

Manz

[11] Patent Number: 5,535,595
[45] Date of Patent: Jul. 16, 1996

[54] REFRIGERANT HANDLING WITH CENTRIFUGAL SEPARATION OF NON CONDENSIBLES FROM REFRIGERANT

[75] Inventor: Kenneth W. Manz, Paulding, Ohio

[73] Assignee: SPX Corporation, Muskegon, Mich.

[21] Appl. No.: 343,661

[22] Filed: Nov. 22, 1994

[51] Int. Cl.$^6$ .................................................. F25B 43/04
[52] U.S. Cl. ................................. 62/85; 62/475; 96/216
[58] Field of Search ........................... 62/474, 475, 85, 62/195; 96/206, 216

[56] References Cited

U.S. PATENT DOCUMENTS

| | | |
|---|---|---|
| 3,049,171 | 8/1962 | Neuerburg et al. ............... 96/216 X |
| 4,343,772 | 8/1982 | Levin et al. ...................... 96/216 X |
| 4,809,520 | 3/1989 | Manz et al. . |
| 5,181,391 | 1/1993 | Manz . |
| 5,203,177 | 4/1993 | Manz et al. . |
| 5,314,529 | 5/1994 | Tilton et al. ..................... 96/216 X |
| 5,344,382 | 9/1994 | Pelzer ............................... 96/216 X |

FOREIGN PATENT DOCUMENTS 495091  12/1975  U.S.S.R. ...................... 96/216

*Primary Examiner*—William E. Tapolcai
*Attorney, Agent, or Firm*—Barnes, Kisselle, Raisch, Choate, Whittemore & Hulbert

[57] ABSTRACT

A refrigerant handling system that includes a refrigerant compressor having an inlet for connection to a source of refrigerant and an outlet for delivering refrigerant under pressure. A refrigerant/non-condensible separator is coupled to the compressor outlet. The separator includes a refrigerant conduit wound in a closed planar spiral, such that refrigerant flowing through the conduit is urged by centrifugal force against the radially outer wall portion of the conduit. Openings in the upper wall portion of the conduit vent air and other non-condensibles of lesser molecular weight than the refrigerant.

19 Claims, 3 Drawing Sheets

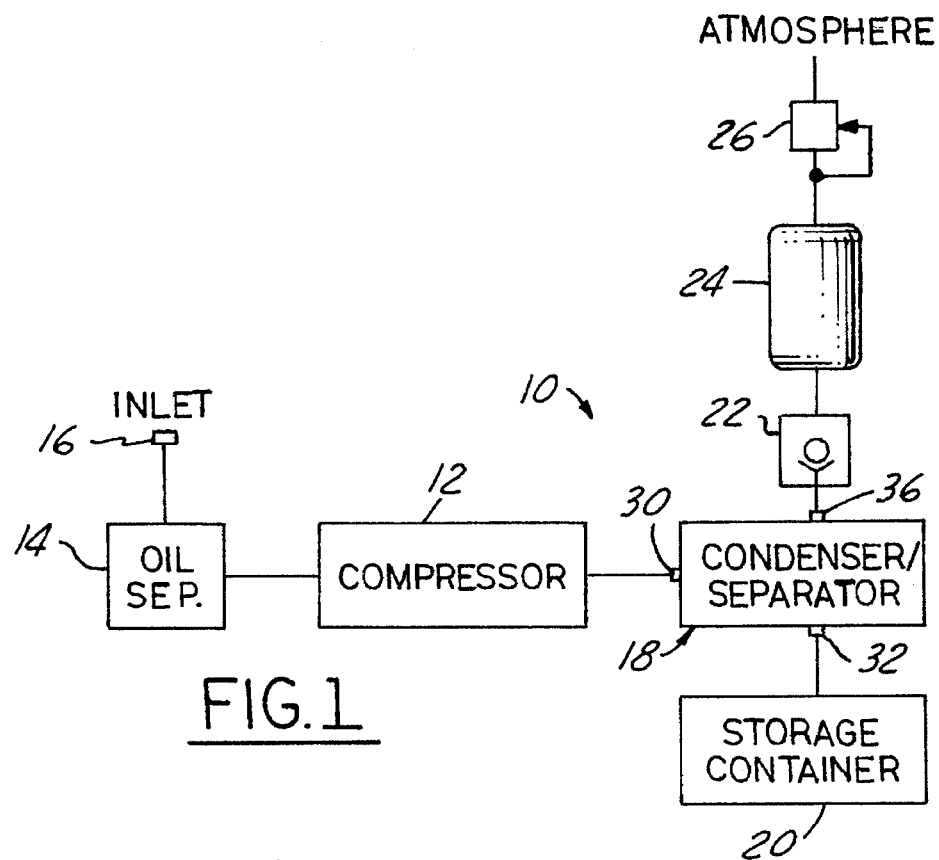
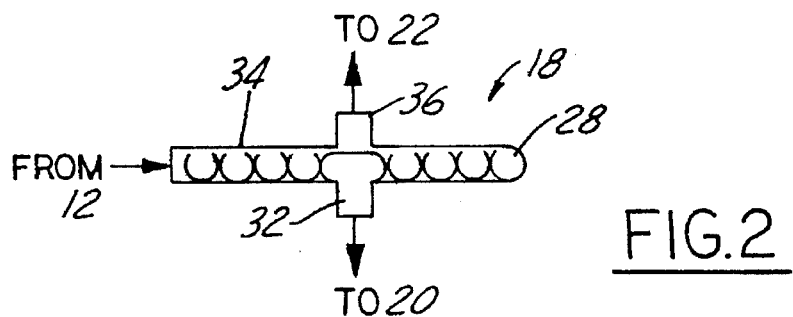
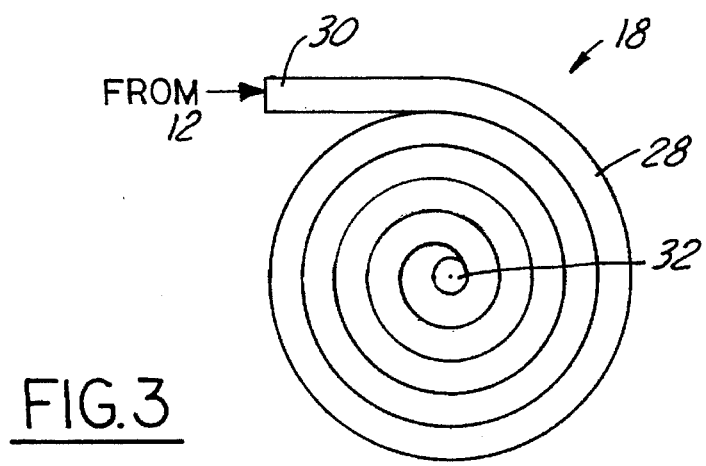

REFRIGERANT HANDLING WITH CENTRIFUGAL SEPARATION OF NON CONDENSIBLES FROM REFRIGERANT

The present invention is directed to refrigerant handling systems with facility for separating air and other non-condensibles from the refrigerant.

BACKGROUND AND SUMMARY OF THE INVENTION

In systems for recovering refrigerant from equipment under service and other refrigerant handling system applications, there have been a number of techniques proposed for removing or purging air and other non-condensibles from the refrigerant. In general, these techniques contemplate accumulation of air and other non-condensibles for purging over liquid phase refrigerant, either in a refrigerant storage container or in an air purge chamber within the refrigerant handling system. See, for example, U.S. Pat. Nos. 5,181,391 and 5,203,177, both assigned to the assignee hereof. These prior-art techniques thus rely upon passive separation of air and other non-condensibles from liquid phase refrigerant either while or after the refrigerant has been condensed.

It is a general object of the present invention to provide a technique for dynamically separating air and other non-condensibles from refrigerant before, while or after the refrigerant is condensed. A more specific object of the present invention is to provide a system, apparatus and method for centrifugally separating refrigerant from air and other non-condensibles having a molecular weight less than that of the refrigerant.

In accordance with one aspect of the present invention, there is provided a refrigerant/non-condensible separator that comprises a refrigerant conduit having an inlet for receiving a refrigerant/non-condensible mixture under pressure and an outlet for delivering refrigerant from which at least some non-condensibles have been separated. The conduit has an arcuate flow path within which the refrigerant is urged by centrifugal force against a radially outer portion of the conduit wall as the refrigerant flows therethrough, and air and other non-condensibles become separated from the refrigerant and migrate toward the upper portion of the conduit. An opening in the upper wall portion of the conduit vents the air and other non-condensibles from within the conduit. In the preferred embodiment of the separator, the conduit is of planar spiral configuration within a housing that forms a vapor space for collection of air and other non-condensibles vented through the conduit opening. The refrigerant enters the spiral conduit at the radially outer end thereof, and exits the conduit at the center of the spiral flow path. An air outlet extends upwardly from the housing coaxially with the refrigerant outlet, which extends downwardly from the spiral center.

In accordance with a further aspect of the present invention, there is provided a refrigerant handling system that comprises a refrigerant compressor having an inlet for connection to a source of refrigerant and an outlet for delivering refrigerant under pressure. The refrigerant/non-condensible separator is operatively coupled to the compressor outlet. The separator includes a refrigerant conduit wound in a closed planar spiral, such that refrigerant flowing through the conduit is urged by centrifugal force against the radially outer wall portion of the conduit. Openings in the upper wall portion of the conduit vent air and other non-condensibles of lesser molecular weight than the refrigerant. The refrigerant/air separator may be disposed in the lower portion of a refrigerant accumulator having an inlet at the upper portion for receiving refrigerant in either liquid, vapor or mixed liquid/vapor phase, and an outlet at such upper portion for feeding refrigerant in vapor phase to the compressor inlet. Liquid refrigerant in the lower portion of the accumulator is heated by the refrigerant flowing through the separator, which promotes condensation of the refrigerant flowing through the separator while at the same time promoting vaporization of the liquid refrigerant in the lower portion of the accumulator.

BRIEF DESCRIPTION OF THE DRAWINGS

The invention, together with additional objects, features and advantages thereof, will be best understood from the following description, the appended claims and the accompanying drawings in which:

FIG. 1 is a schematic diagram of a refrigerant handling system in accordance with one presently preferred embodiment of the invention;

FIG. 2 is a schematic diagram of the condenser/separator illustrated in FIG. 1;

FIG. 3 is a schematic plan view of the separator illustrated in FIG. 2;

DETAILED DESCRIPTION OF THE PREFERRED EMBODIMENTS

Figure 4:
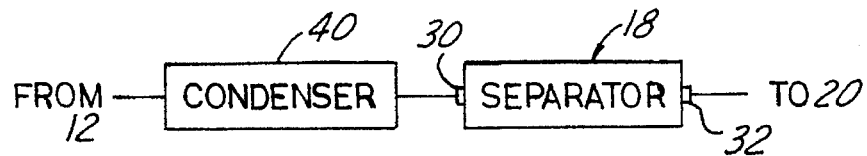
FIGS. 4–6 are fragmentary schematic diagrams that illustrate respective modifications to the system illustrated in FIG. 1.

FIGS. 1–3 illustrate a refrigerant recovery system 10 in accordance with one presently preferred embodiment of the invention as comprising a refrigerant compressor 12 having an inlet connected through an oil separator 14 to a coupling 16 for connection to refrigeration equipment from which refrigerant is to be recovered. Compressor 12 also has an outlet connected to a condenser/separator 18, which at least partially condenses refrigerant passing therethrough while simultaneously separating air and other non-condensibles from the refrigerant. The refrigerant outlet of condenser/separator 18 is connected to a refrigerant storage container 20, while a vent of condenser/separator 18 is connected through a check valve 22 to an air purge vessel 24. The outlet of vessel 24 purges air and other non-condensibles to atmosphere through a pressure regulating valve 26.

Condenser/separator 18 is illustrated in greater detail in FIGS. 2 and 3 as comprising a refrigerant conduit 28 in the form of a flat continuous spiral with closed (i.e., abutting) coils. The outer end 30 of spiral conduit 28 receives the refrigerant/non-condensible mixture from compressor 12. The inner end 32 of conduit 28 extends vertically downwardly from the center of the spiral coil for connection to storage container 20. Conduit 28 is enclosed within a housing 34. The upper wall portion of conduit 28 is open to the interior of housing 34, either by means of a multiplicity of openings throughout the length of the coiled conduit or a slot that extends intermittently or continuously throughout the length of the conduit. Housing 34 thus forms a vapor space from which a port or vent 36 extends upwardly coaxially with downwardly extending conduit outlet 34.

In operation, as a mixture of refrigerant and air or other non-condensibles flows through spiral conduit 28, centrifugal force acting on the mixture throws refrigerant against the outer wall portion of the conduit due to the higher molecular weight and density of the refrigerant as compared with air and other non-condensibles. The air and other non-condensibles, being in vapor phase, gravitate toward the top portion of the conduit following separation from the refrigerant, and flow through the opening in the upper portion of the conduit into the vapor space of housing 34, and thence through vent 36 to chamber 24. Check valve 22 and pressure regulator 26 function to maintain a lower pressure in chamber 24 than at vent 36 of separator 18. A refrigerant adsorbing desiccant may be placed in chamber 24 for adsorbing any refrigerant vapor contained within the air and other non-condensibles vented through the chamber. See, in this respect, copending application 08/316,260 assigned to the assignee hereof.

Figure 5:
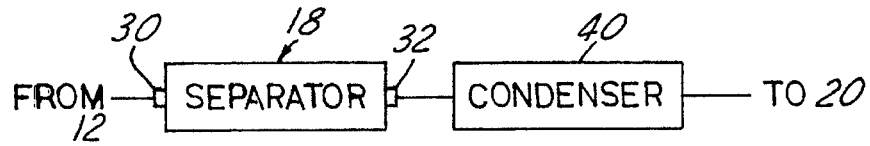
Figure 6:
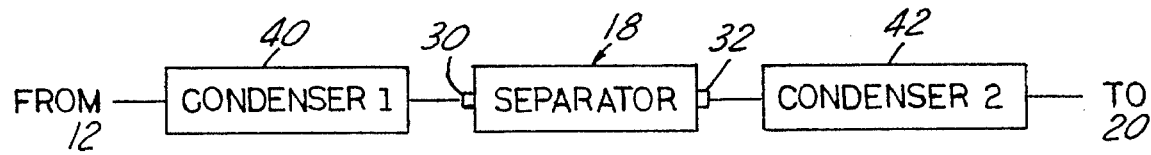

In the embodiment of FIG. 1, condenser/separator 18 functions both to separate air and other non-condensibles from the refrigerant, and to at least partially condense refrigerant flowing to storage container 20. The condensing function is supplemental to the primary separating function. Separator 18 may also be employed in conjunction with one or more supplemental condensers. A supplemental condenser 40 (FIG. 4) may be connected between the separator and the compressor outlet, whereupon separator 18 acts upon a refrigerant/non-condensible mixture in which the refrigerant is condensed and possibly sub-cooled. Alternatively, the supplemental condenser 40 may be connected to refrigerant outlet 32 of separator 18 (FIG. 5), whereby separator 18 functions upon an essentially vapor refrigerant/non-condensible mixture. As a third alternative illustrated in FIG. 6, separator 18 may be connected between condensers 40,42, whereupon separator 18 operates on a quality mixture of refrigerant liquid and vapor with entrained and/or dissolved air and/or other non-condensibles.

Figure 7:
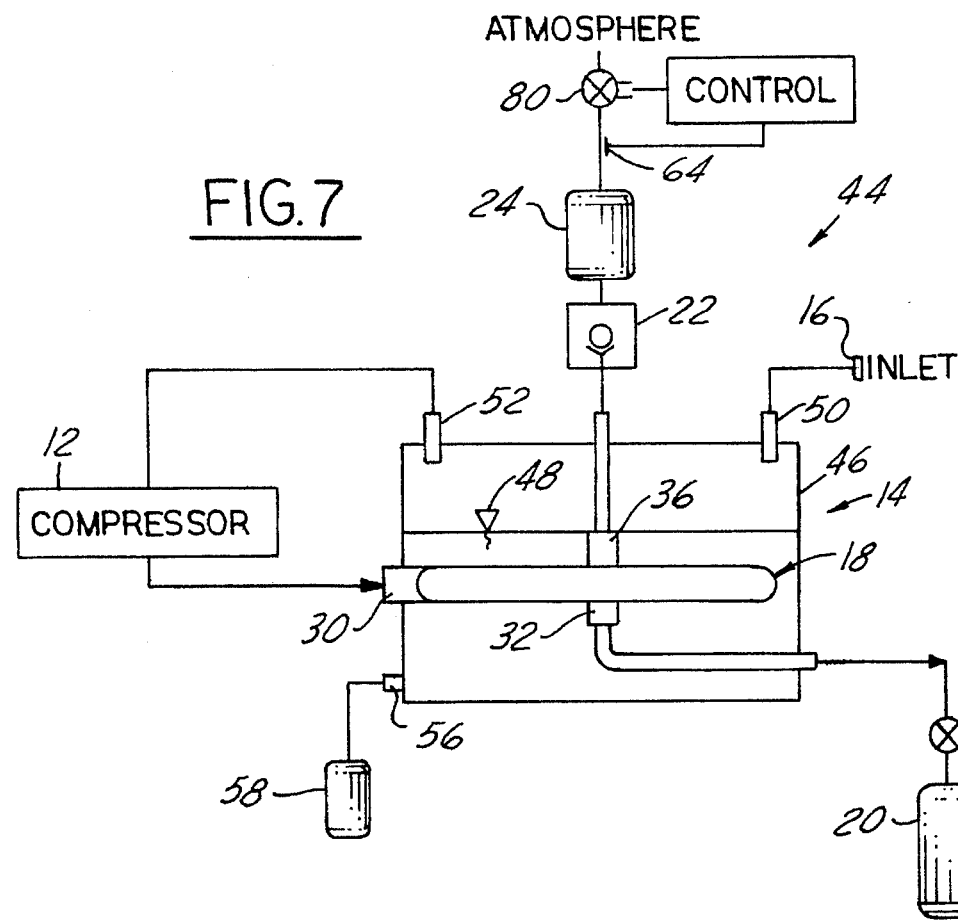
FIG. 7 is a schematic diagram of a refrigerant handling system in accordance with a modified embodiment of the invention.

FIG. 7 illustrates a refrigerant recovery system 44 in accordance with a modified embodiment of the invention, in which oil separator 14 takes the form of a refrigerant accumulator 46. Accumulator 46 has an open internal volume, with separator 18 being disposed at the lower portion of such volume at a position normally to be covered by liquid phase refrigerant under control of a liquid refrigerant level sensor 48. Accumulator 46 has an inlet 50 at the upper portion of the accumulator volume for connection to inlet coupling 16, and an outlet 52 also at the upper portion of the accumulator volume connected through oil separator 14 to the inlet of compressor 12. Refrigerant outlet 32 of separator 18 is connected through a manual valve 54 to refrigerant storage container 20. An oil drain 56 is coupled to the lower portion of accumulator 46 for draining oil to a container 58.

In operation, accumulator 46 functions as a heat exchanger for exchanging heat between refrigerant flowing to and from compressor 12, and as an oil separator for incoming refrigerant. See, in this respect, U.S. Pat. No. 4,809,520 assigned to the assignee hereof. Any portion of incoming refrigerant in liquid phase collects at the lower portion of accumulator 46 surrounding separator 18. The refrigerant flowing from compressor 12 through separator 18 looses heat to such surrounding refrigerant, which helps condense the refrigerant flowing to storage container 20 while at the same time vaporizing the surrounding refrigerant for flow to compressor 12. Air and/or other non-condensibles separated from refrigerant within separator 18 flow through check valve 22 to chamber 24, which may contain a refrigerant adsorbing desiccant as previously described. A solenoid valve 60 at the outlet of chamber 24 is controlled by electronics 62 responsive to a pressure sensor 64 for sensing pressure of air and other non-condensibles within chamber 24.

Figure 8:
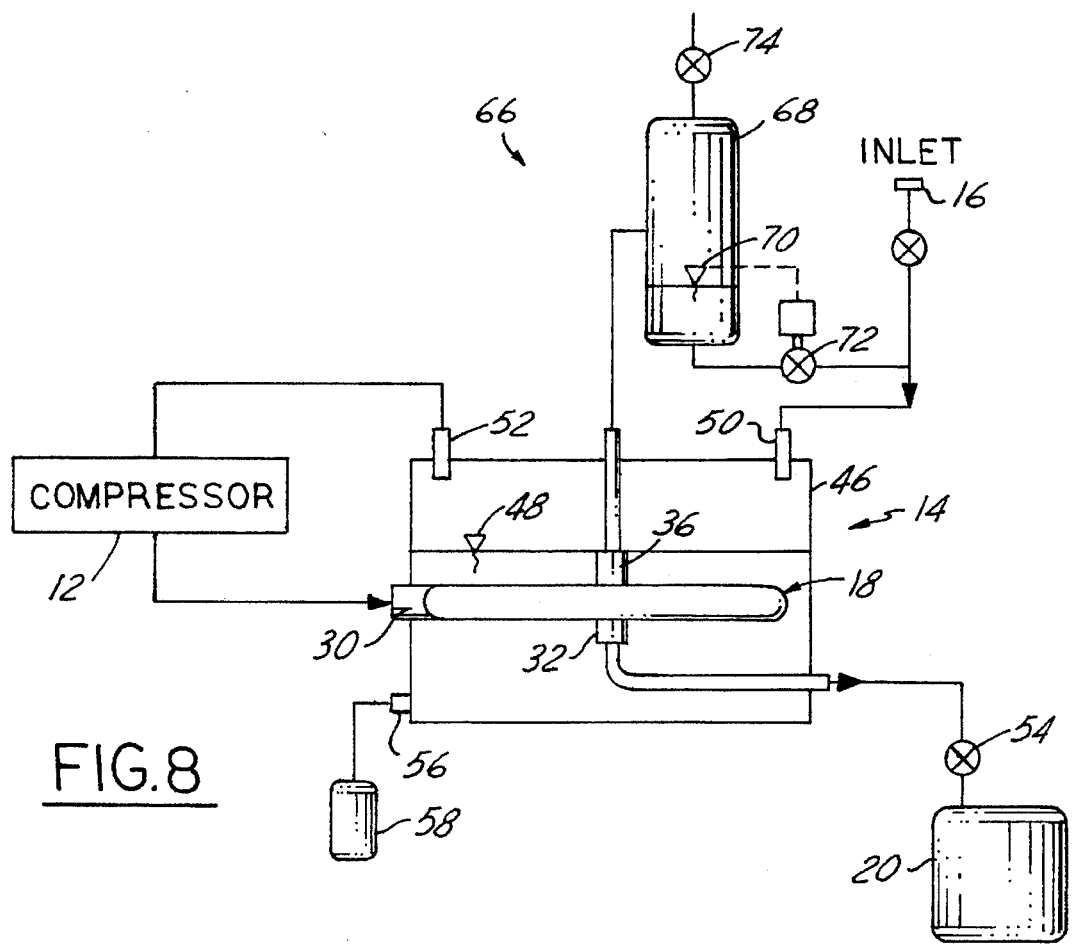
FIG. 8 is a schematic diagram of a refrigerant handling system in accordance with a further embodiment of the invention.

FIG. 8 illustrates a modified refrigerant recovery system 66, in which purge chamber 24 in FIGS. 1 and 7 is replaced by an non-condensible purge chamber 68 of the type illustrated in U.S. application Ser. No. 08/100,424 assigned to the assignee hereof. That is, the vent 36 of separator 18 is connected to purge chamber 68 so that any refrigerant vapor vented along with the air and other non-condensibles collects in liquid phase at the lower portion of chamber 68 while the air and other non-condensibles collect in vapor phase at the upper portion of the chamber over the refrigerant. A liquid level sensor 70 controls a solenoid valve 72 for selectively feeding such accumulated refrigerant in liquid phase to inlet 50 of accumulator 46—i.e., when the level of accumulated liquid phase refrigerant within chamber 68 reaches or exceeds the level of sensor 70. The upper portion of chamber 68 is vented to atmosphere through a valve 74.

Figure 9:
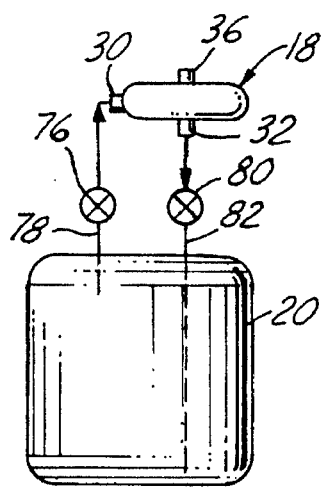
FIG. 9 is a schematic diagram of a refrigerant handling system in accordance with another embodiment of the invention.

FIG. 9 illustrates separator 18 employed for purging air from within storage container 20. (The same arrangement may be employed for purging from within a non-condensible purge chamber.) That is, refrigerant/non-condensible inlet 30 of separator 18 is connected through a valve 76 to the vapor port or purge port 78 of container 20, while refrigerant outlet 32 of separator 18 is connected through a valve 80 to the liquid port 82 of container 20. Air/non-condensible port 36 of separator 18 is vented to atmosphere, either directly or through a chamber 24 or 68 as illustrated in the previous embodiments. Thus, pressure of refrigerant and non-condensible vapor in container 20 causes the same to vent through separator 18 when valves 76,80 are opened. The non-condensibles are purged, and the refrigerant is returned to container 20. A refrigerant pump may be required.

Figure 10:
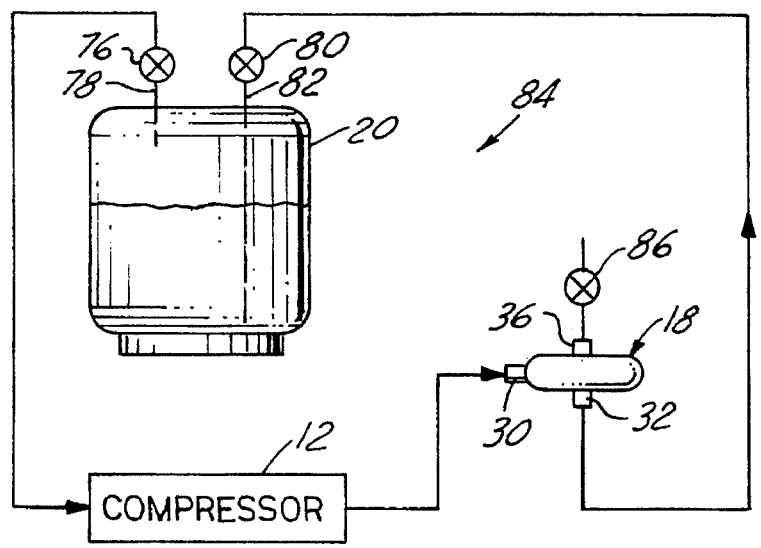
FIG. 10 is a schematic diagram of a refrigerant handling system in accordance with yet another embodiment of the invention.

FIG. 10 illustrates a refrigerant handling system 84 for purging air and other non-condensibles from the head space of container 20. That is, the inlet of compressor 12 is connected through valve 76 to the vapor port or purge port 78 of container 20. The outlet of compressor 12 is connected through separator 18 and valve 80 to liquid port 82 of container 20. Air/non-condensible port 36 of separator 18 is vented through a manual valve 86, either directly to atmosphere or through a supplemental purge chamber as in previous embodiments. Thus, compressor 12 draws a mixture of refrigerant vapor and non-condensibles from within storage container 20, and returns refrigerant in either liquid or mixed liquid/vapor phase from which air and other non-condensibles have been separated by separator 18.

What is claimed is:

1. A refrigerant/non-condensible separator that comprises:

refrigerant conduit means having an inlet for receiving a refrigerant/non-condensible mixture under pressure and an outlet for delivering refrigerant from which non-condensibles have been at least partially separated, said refrigerant conduit means having an arcuate flow path such that refrigerant is urged by centrifugal force against a radially outer wall portion of said conduit means, and means coupled to an upper wall portion of said conduit means between said inlet and said outlet for drawing off non-condensibles of lesser molecular weight than refrigerant.

2. The separator set forth in claim 1 wherein said refrigerant conduit means provides a spiral flow path.

3. The separator set forth in claim 2 wherein said refrigerant conduit means comprises a spiral refrigerant conduit having an open upper wall portion, a housing enclosing said conduit with a vapor space into which said open upper wall portion opens, and a port extending from said housing for venting non-condensibles separated from the refrigerant flowing through said conduit.

4. The separator set forth in claim 3 wherein said spiral conduit has said inlet at a radially outer end thereof and said refrigerant outlet at the center of said spiral.

5. The separator set forth in claim 4 wherein said non-condensible port extends upwardly from said housing coaxially with said refrigerant outlet, which extends downwardly from said conduit.

6. The separator set forth in claim 5 wherein said conduit is formed in a planar spiral.

7. A refrigerant handling system that comprises a refrigerant/non-condensible separator as set forth in claim 1 and a compressor having an inlet and an outlet, means for connecting said compressor inlet to a source of refrigerant, and means for connecting said compressor outlet to said separator inlet.

8. The system set forth in claim 7 wherein said means for connecting said compressor outlet to said separator comprises means for at least partially condensing refrigerant passing therethrough.

9. The system set forth in claim 7 wherein said means for connecting said compressor inlet to a source of refrigerant comprises a refrigerant accumulator having an open internal volume, an inlet at an upper portion of said volume for connection to a source of refrigerant and an outlet at said upper portion of said volume for connection to said compressor inlet, said separator being disposed in a lower portion of said volume for heat exchange with refrigerant in said lower portion of said volume.

10. The system set forth in claim 9 further comprising means for maintaining liquid phase refrigerant in said lower portion of said volume at a level covering said separator.

11. The system set forth in claim 9 further comprising an oil drain at said lower portion of said volume.

12. A refrigerant handling system that comprises:

a refrigerant compressor having an inlet for connection to a source of refrigerant and an outlet for delivering refrigerant under pressure, and means coupled to said compressor outlet for separating air and other non-condensibles from refrigerant, characterized in that said separating means comprises:

refrigerant conduit means having an inlet coupled to said compressor outlet, an outlet, and means extending between said inlet and said outlet defining a spiral refrigerant flow path such that refrigerant flowing through said path is urged by centrifugal three against a radially outer wall portion of said conduit means, and opening memos in an upper wall portion of said conduit means between said inlet and said outlet for venting air and other non-condensibles of lesser molecular weight than refrigerant.

13. The system set forth in claim 12 wherein said separating means further comprises a housing enclosing said conduit means and forming a vapor space open to said opening means between said inlet and said outlet, and a port extending from said vapor space for venting non-condensibles separated from refrigerant flowing through said separating means.

14. The system set forth in claim 13 further comprising a refrigerant accumulator for connecting said compressor inlet to a source of refrigerant, said accumulator having an open internal volume, an inlet at an upper portion of said volume for connection to a source of refrigerant and an outlet at said upper portion of said volume for connection to said compressor inlet, said separator being disposed in a lower portion of said volume for heat exchange with refrigerant in said lower portion of said volume.

15. The system set forth in claim 14 further comprising means for maintaining liquid phase refrigerant in said lower portion of said volume at a level covering said separator.

16. The system set forth in claim 14 further comprising an oil drain at said lower portion of said volume.

17. A method of separating air and other non-condensibles from refrigerant comprising the step of:

(a) directing a mixture of refrigerant and non-condensibles, in either liquid, vapor or mixed liquid/vapor phase, through a spiral refrigerant conduit such that the refrigerant, having a greater molecular weight than non-condensibles, is separated from the non-condensibles by centrifugal force and the non-condensibles separated from the refrigerant migrate toward the upper portion of said conduit, and (b) drawing the non-condensibles off of the upper portion of said conduit.

18. The method set forth in claim 17 comprising the additional step of:

(c) directing refrigerant from said conduit to a liquid refrigerant storage container.

19. The method set forth in claim 17 wherein said refrigerant in said step (a) is in either liquid, vapor or mixed liquid/vapor phase, and wherein said method comprises the additional step of:

(c) at least partially condensing the refrigerant in vapor phase simultaneously with said step (a).

\* \* \* \* \*